United States Patent Office 3,411,758
Patented Nov. 19, 1968

3,411,758
COOLING TOWERS
Philip David Edmondson, 50 Rochester Row,
Westminster, London SW. 1, England
Continuation of application Ser. No. 584,526, Oct. 5,
1966. This application Feb. 12, 1968, Ser. No. 704,942
Claims priority, application Great Britain, Oct. 7, 1965,
42,658/65
4 Claims. (Cl. 261—24)

ABSTRACT OF THE DISCLOSURE

A natural draught cooling tower in which an upper irrigation stack is mounted above a decking which divides the inlet to the tower into two parts, the decking having a central impermeable part in the centre of which a fan unit is mounted, the periphery of the decking being permeable, and there being a cross-flow packing mounted below the peripheral region of the decking.

---

This application is a continuation of application Ser. No. 584,526, filed Oct. 5, 1966, and now abandoned.

This invention relates to cooling towers and more especially to natural draught cooling towers of the kind having an air inlet at the bottom of the tower.

It is a main object of the present invention to provide a natural draught cooling tower of improved construction for use in locations where the amount of cooling to be performed by the tower is such that a natural draught tower on its own would either be uneconomically large or inadequate to carry out the required cooling.

According to the invention there is provided a natural draught cooling tower of the kind having an air inlet at the bottom of the tower, comprising a substantially horizontal decking in the tower dividing the inlet into two parts, which decking is impermeable except for an annular peripheral region, an irrigation stack packed in the tower above the decking for cooling water by natural draught induced into the tower through the upper part of the inlet, an air flow induction unit mounted centrally in the decking and operable to draw air into the tower through the lower part of the inlet and to augment the natural draught in the upper part of the tower, cross-flow packing mounted in the tower beneath the said annular peripheral region of the decking and around the lower part of the inlet, and means associated with the peripheral region of the decking for collecting water which has fallen through the upper irrigation stack and distributing that water over the cross-flow packing.

In a preferred embodiment of the invention the air flow induction unit comprises a number of fans mounted centrally in the decking, the fans being mounted in a casing which forms a continuous surface with the decking. These fans draw air through the cross-flow packing and discharge that air centrally up the tower so that the natural draught air flow which passes through the packing above the decking in the tower is augmented by the induction effect of the air discharged upwardly from the fans. This effect may be increased, if required, by merging the outlets from the fans into a single central outlet. Thus the water being cooled in the tower first of all contacts the natural draught air flow through the upper part of the inlet as the water falls through the irrigation stack packed in the tower above the decking.

The intermediate decking is provided with falls, kerbing and water outlets which distribute the partly cooled water on to the top of the cross-flow packing which is supported around and within the outer walls of the tower behind the lower part of the air inlet. The cooled water falls from the cross-flow packing into the collecting basin at the bottom of the tower.

Figure 1:
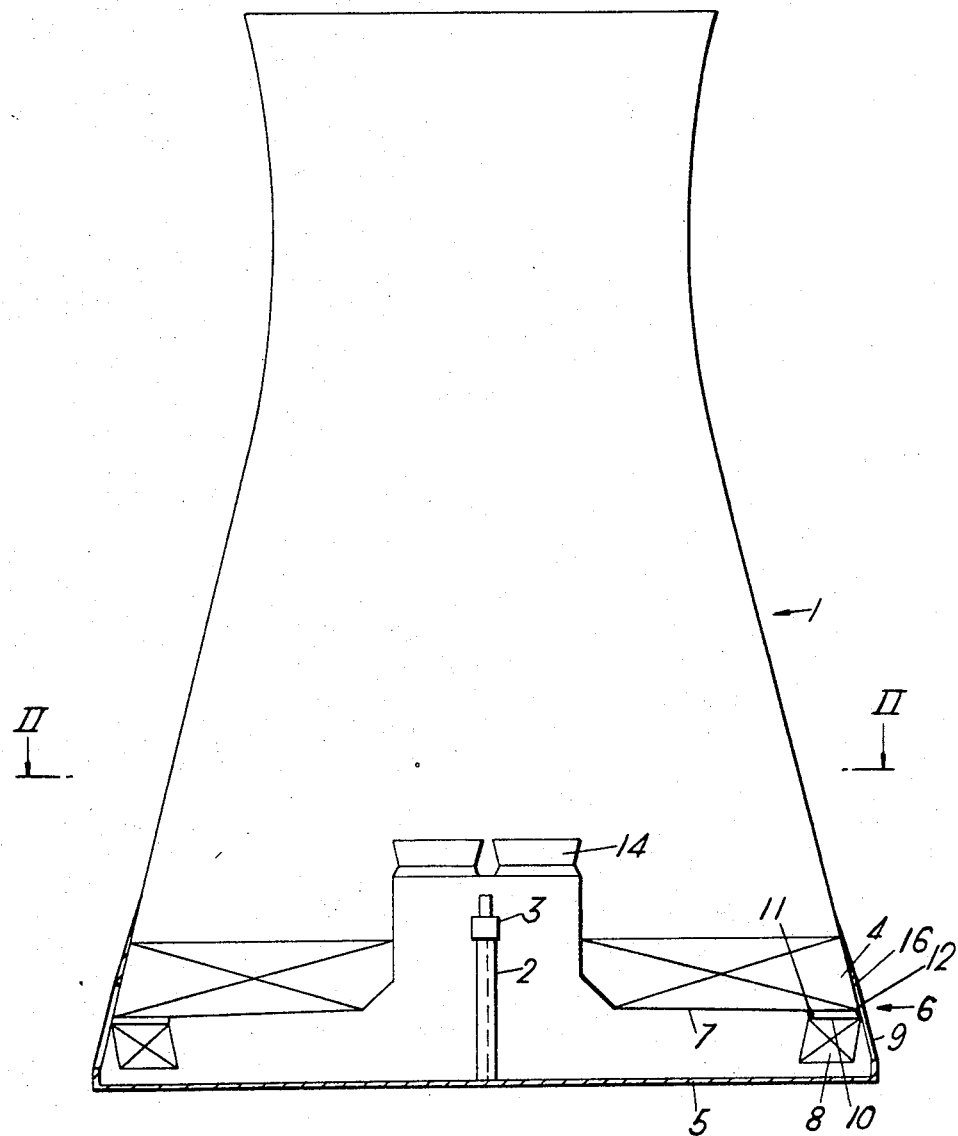
Figure 2:
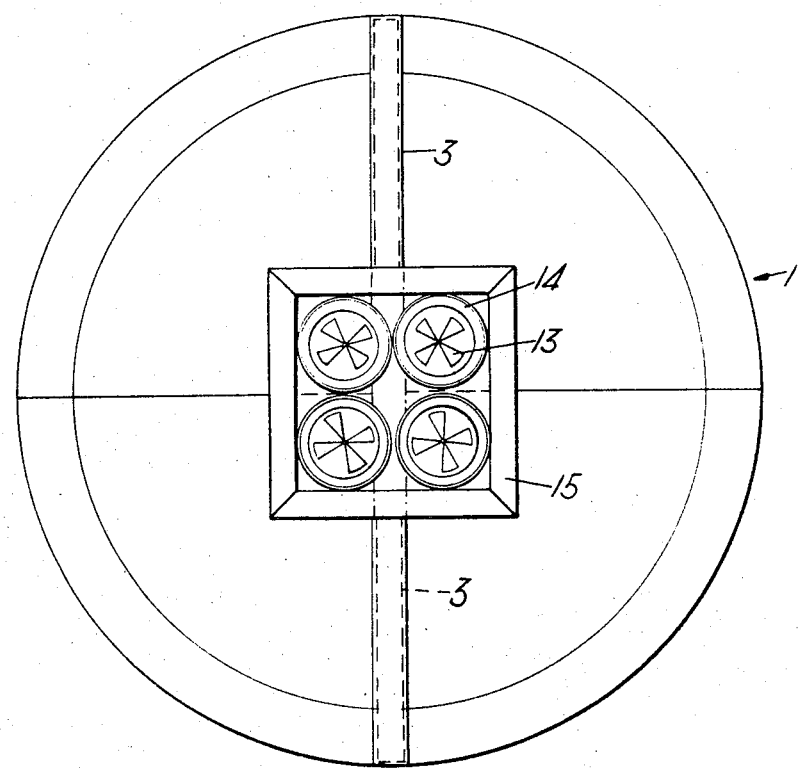

In order that the invention may be more clearly understood an embodiment thereof will now be described, by way of example, with reference to the accompanying drawings in which:

FIGURE 1 is a diagrammatic sectional elevation of a cooling tower constructed in accordance with the invention, and FIGURE 2 is a sectional view of the cooling tower on line II—II of FIGURE 1.

Referring to the drawings a natural draught cooling tower, indicated generally by the reference 1 is supplied with warm water to be cooled through a supply pipe, not shown, which is connected to a central stand pipe 2 extending up the tower, which stand pipe leads to an irrigation system including a culvert 3 arranged on a diameter of the tower, from which culvert the warm water is distributed over the top of an irrigation stack 4 of known kind packed into the tower, by means of header pipes with sprayers or by an open trough system.

The irrigation stack 4 may be of various types all well known, and for example may comprise timber laths or bars of either rectangular or triangular cross-section supported in open arrangement by timber or concrete beams and posts. Alternatively the stack may be an arrangement of plain or embossed or corrugated sheets formed of materials such as asbestos cement, plastics or plastics coated steel, having their surfaces in vertical planes spaced apart to form a plurality of contiguous passageways for water and air. The airflow through the stack will be a mixture of cross flow and upwards flow, the air flowing from the air inlet and being distributed through the whole radius of the stack before leaving the top of the stack.

The tower stands on a collecting basin 5 which collects the cooled water after it has fallen through the tower and there is a peripheral air inlet 6 around the bottom of the tower.

Mounted in the tower there is a substantially horizontal decking 7 which divides the inlet 6 into two parts. The irrigation stack 4 is packed in the tower above the decking 7, and beneath the decking 7 there is mounted a cross-flow packing 8 of known kind which extends around the inside of the periphery of the tower just behind the lower part 9 of the air inlet 6.

Water which has fallen through the irrigation stack 4 on to the decking 7 is caused to flow outwardly on the decking which is slightly sloping downwardly and outwards. The water is then collected on a horizontal portion 10 of the decking 7 overlying the cross-flow packing 8, between a step 11 and kerbing 12. The horizontal portion 10 of the decking 7 is provided with a plurality of suitably spaced apertures through which the collected water falls on to the top of the cross-flow packing 8, and the apertures may be fitted with nozzles to feed the water in the form of streams. The cooled water after passage through the packing 8 falls into the collecting basin 5 from which it is pumped for re-use.

The collecting basin 5 may alternatively be an annular basin lying only under the cross-flow packing 8, and in that case the decking 7 will be made watertight to avoid water falling outside the basin.

An air flow induction unit is mounted centrally in the decking 7 and comprises four fans 13 which are mechanically driven and are each provided with an air casing 14 which forms a continuous surface with the substantially horizontal decking 7. The casings 14 of the fans 13 are enclosed in a wall 15.

When the fans are in operation they induce a draught through the lower part 9 of the air inlet 6 which draught fllows through the cross-flow packing 8 and then up through the fans and is discharged centrally upwards in the main part of the cooling tower 1. This vertical discharge of air upwardly in the tower augments the natural draught in the upper part of the tower which draught is drawn through the upper part 16 of the air inlet 6 and through the packing 4 of conventional kind into the upper part of the tower.

Not only do the fans give an auxiliary cooling to the water by the drawing of air through the lower part of the air inlet 6 and over the cross-flow packing 8, but also the air flow causes an increased draught through the upper part of the tower thereby increasing the flow through the upper irrigation stack 4. Thus a much greater cooling effect is possible with the same height of cooling tower than has been possible hitherto because of the division of the air inlet into two parts, the air flowing into the tower through each part cooling the water flowing down through the tower separately. The warm water thus undergoes a dual cooling in the tower. Firstly as the water falls through the irrigation stack 4 the cooling is due to the assisted natural draught through the upper part 16 of the air inlet. Secondly the water is further cooled as it trickles down the cross-flow packing 8 by the radially directed flow drawn through the lower part 9 of the air inlet by the fans 13.

Thus the cooling tower according to the invention is able to carry out a much heavier cooling duty than would be possible with a natural draught cooling tower of the same height. The division of the packing of the tower into an upper assisted natural draught section and a lower mechanical draught cross-flow section minimises the pumping head required for the warm water pumped to the tower for cooling.

When lighter duty cooling is required the fans 13 can be switched off so that the tower still operates as a natural draught cooling tower, the cooling being effected by the flow of air naturally induced through the irrigation stack 4.

That which is claimed is:

1. A natural draught cooling tower of the kind having an air inlet at the bottom of the tower, comprising a substantially horizontal decking in the tower dividing the inlet into two parts, which decking comprises an impermeable central region and a permeable annular peripheral region, an irrigation stack packed in the tower above the decking for cooling water by natural draught induced into the tower through the upper part of the inlet, an air flow induction unit mounted centrally in the impermeable central region of the decking and operable to draw air into the tower through the lower part of the inlet and to augment the natural draught in the upper part of the tower, cross-flow packing mounted in the tower beneath the said annular peripheral region of the decking and around the lower part of the inlet, and means associated with the peripheral region of the decking for collecting water which has fallen through the upper irrigation stack and flowed over the impermeable central region of the decking, and distributing that water over the cross-flow packing, said cross-flow packing extending inwardly from the inlet to an extent less than one half the radius of the base of the tower.

2. A cooling tower comprising, in combination:
   a vertically elongate tower having a side wall presenting an air outlet at its top and said side wall having a circumferentially extending air inlet adjacent the bottom of the tower,
   air induction means substantially centrally disposed within said tower and including a vertical casing substantially smaller than said tower to define an annular space between said casing and said side wall of the tower, said casing having a lower end spaced above the bottom of said tower and an upper discharge end spaced substantially below the top of said tower,
   annular decking means extending from the lower end of said casing to said side wall of the tower, said decking means being substantially horizontal and positioned at a height spaced above the bottom of the tower to divide said air inlet into upper and lower portions communicating with the interior of said tower respectively above and below said decking means, said decking means having an imperforate central region which constitutes the major portion of its area and which extends from said casing to an outer boundary closely spaced from said side wall, and said decking means being perforate in that minor region thereof from said boundary to said side wall,
   relatively narrow cross-flow packing disposed below said perforate region of the decking means and having a height commensurate with the height of said lower portion of the air inlet whereby air induced through said lower portion of the air inlet by said air induction means traverses said cross-flow packing,
   an irrigation stack extending between said casing and said side wall above said decking means within said annular space between the casing and side wall, and overlying said cross-flow packing only in an outer region of the irrigation stack, said irrigation stack having a height greater than the height of said upper portion of said air inlet and said upper discharge end of the casing terminating above said irrigation stack but well below the top of said tower whereby the mechanically induced air flow through said cross-flow packing is discharged upwardly within said tower to augment the natural draught through said upper portion of the air inlet and which passes upwardly through said irrigation stack,
   and means for distributing water to be cooled to the upper surface of said irrigation stack.

3. The cooling tower according to claim 2 wherein said irrigation stack is annular in configuration.

4. The cooling tower according to claim 3 wherein said irrigation stack closely embraces said casing and extends therefrom into close proximity with said side wall whereby only an annular marginal region of the irrigation stack overlies said cross-flow packing.

References Cited

UNITED STATES PATENTS

| | | |
|---|---|---|
| 2,545,926 | 3/1951 | Lau Bach. |
| 2,776,121 | 1/1957 | Fordyce _____ 261—24 |
| 3,115,534 | 12/1963 | Bottner. |

FOREIGN PATENTS

| | | |
|---|---|---|
| 720,676 | 12/1931 | France. |
| 531,366 | 8/1931 | Germany. |
| 841,089 | 7/1960 | Great Britain. |

HARRY B. THORNTON, *Primary Examiner.*

TIM R. MILES, *Assistant Examiner.*